(12) United States Patent
Poupard, III

(10) Patent No.: US 11,831,938 B1
(45) Date of Patent: Nov. 28, 2023

(54) SYSTEMS AND METHODS FOR RECOMMENDING CORRELATED AND ANTI-CORRELATED CONTENT

(71) Applicant: Safran Passenger Innovations, LLC, Brea, CA (US)

(72) Inventor: Louis Poupard, III, Brea, CA (US)

(73) Assignee: Safran Passenger Innovations, LLC, Brea, CA (US)

( * ) Notice: Subject to any disclaimer, the term of this patent is extended or adjusted under 35 U.S.C. 154(b) by 0 days.

(21) Appl. No.: 17/867,103

(22) Filed: Jul. 18, 2022

Related U.S. Application Data

(60) Provisional application No. 63/348,827, filed on Jun. 3, 2022.

(51) Int. Cl.
*H04N 21/266* (2011.01)
*H04N 21/24* (2011.01)
*H04N 21/239* (2011.01)

(52) U.S. Cl.
CPC ....... *H04N 21/266* (2013.01); *H04N 21/2393* (2013.01); *H04N 21/2407* (2013.01)

(58) Field of Classification Search
CPC ........... H04N 21/2392; H04N 21/2407; H04N 21/266
See application file for complete search history.

(56) References Cited

U.S. PATENT DOCUMENTS

| | | | | |
|---|---|---|---|---|
| 8,704,760 B2* | 4/2014 | Kang | | G10L 17/26 345/156 |
| 9,509,798 B1* | 11/2016 | Thomas | | H04N 21/00 |
| 11,653,064 B2* | 5/2023 | Weerasinghe | | H04N 21/4662 725/14 |
| 2007/0271518 A1* | 11/2007 | Tischer | | H04N 21/4532 715/744 |
| 2007/0271580 A1* | 11/2007 | Tischer | | H04H 60/07 725/35 |
| 2010/0037255 A1* | 2/2010 | Sheehan | | H04N 21/4331 725/34 |
| 2013/0276027 A1* | 10/2013 | Sheehan | | H04N 21/435 725/35 |
| 2014/0380359 A1* | 12/2014 | Musil | | H04N 21/6582 725/34 |
| 2015/0020106 A1* | 1/2015 | Belyaev | | H04N 21/44226 725/48 |
| 2015/0150032 A1* | 5/2015 | Birnkrant | | H04N 21/4415 725/12 |

(Continued)

OTHER PUBLICATIONS

European Patent Office, International Search Report and Written Opinion, dated Jul. 26, 2023.

*Primary Examiner* — Michael B. Pierorazio
(74) *Attorney, Agent, or Firm* — Ryan Dean; Umberg Zipser LLP

(57) ABSTRACT

Systems and methods are described herein for providing content recommendations to a user based on an elapsed playback time of the current content on the user device. A recommendation server having memory and a processor can be used to compare an elapsed playback time of the current content and compare the elapsed playback time with one or more threshold values. If the elapsed playback time is less than a first threshold, anticorrelated content with respect to the current content can be recommended and presented on or using the user device.

20 Claims, 5 Drawing Sheets

(56) References Cited

U.S. PATENT DOCUMENTS

| | | | | |
|---|---|---|---|---|
| 2015/0296234 A1* | 10/2015 | Korst | ................ | G06Q 30/0282 |
| | | | | 725/87 |
| 2015/0365725 A1* | 12/2015 | Belyaev | ............ | H04N 21/6175 |
| | | | | 725/46 |
| 2015/0382063 A1* | 12/2015 | Eggink | ................ | H04N 21/466 |
| | | | | 725/14 |
| 2016/0044349 A1* | 2/2016 | Jackson | ............ | H04N 21/6582 |
| | | | | 725/116 |
| 2017/0034543 A1* | 2/2017 | Gerede | ................ | G06F 16/735 |
| 2018/0234732 A1* | 8/2018 | Galuten | ............ | H04N 21/4668 |
| 2018/0359506 A1* | 12/2018 | Hodge | ................... | H04L 65/70 |
| 2019/0098371 A1* | 3/2019 | Keesan | ............ | H04N 21/25883 |
| 2020/0007958 A1* | 1/2020 | Wondra | ................ | G06Q 50/01 |
| 2020/0396497 A1 | 12/2020 | Liu et al. | | |
| 2021/0258653 A1 | 8/2021 | Matthews et al. | | |
| 2022/0043876 A1 | 2/2022 | Pande et al. | | |

\* cited by examiner

SYSTEMS AND METHODS FOR RECOMMENDING CORRELATED AND ANTI-CORRELATED CONTENT

This application claims priority to U.S. provisional patent application having Ser. No. 63/348,827 filed on Jun. 3, 2022. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is recommendation systems and methods.

BACKGROUND

The following description includes information that may be useful in understanding the present invention. It is not an admission that any of the information provided herein is prior art or relevant to the presently claimed invention, or that any publication specifically or implicitly referenced is prior art.

Online stores and user-generated media platforms utilize recommendation systems to facilitate browsing of a high number of items. Such systems generally rely on centrally stored data about a user's preferences and either intrinsic properties of the items (i.e., content-based recommenders) or other users' preferences (i.e., collaborative filtering recommenders).

For example, existing video playback applications known to the inventor create digital correlations between media titles available to consumers based on content metadata and consumer viewing habits. Such applications often only recommend similar or correlated media titles to a consumer following conclusion of media playback of a piece of content. These recommendations are generally based on the user finishing the original content, and the content provider having a list of similar content to recommend that is correlated to the current title.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for systems and methods for recommending anti-correlated content.

SUMMARY OF THE INVENTION

The inventive subject matter provides apparatus, systems, and methods for providing a recommendation system for a vehicular content distribution network, and specifically systems and methods for recommending correlated and anti-correlated content to a user based upon elapsed duration of a content being watched. Preferably, such systems and methods are utilized in conjunction with an in-vehicle network such as an in-flight entertainment system used in aircraft and other vehicles. However, it is contemplated that the systems and methods described herein could be utilized on other networks that are unrelated to a vehicle. For example, it is contemplated that the systems and methods described herein could be used with any services or systems that offers a set of content with recommendations, which could include, for example, content streaming services such as NETFLIX™, DISNEY+™ HULU™ and so forth, on-demand content viewable at hotels and other lodgings, and so forth.

In some embodiments, a server is provided having a processor and non-transitory memory, wherein the server is communicatively coupled to a network configured to distribute content to a plurality of users. In embodiments for a vehicle, the server can be communicatively coupled to an in-vehicle network for distributing content to a plurality of users within the vehicle. As an example, the server could be connected with a plurality of in-flight entertainment devices, such as those typically disposed within a seat back of a vehicle but may also be connected with one or more devices of the users. Exemplary in-flight entertainment systems and devices are described in U.S. Pat. No. 9,015,776 titled "Entertainment Systems Utilizing Field Replaceable Storage Units" and U.S. Pat. No. 10,173,605 titled "Display Unit for a Vehicle". Exemplary user devices could include, for example, smart phones, tablet PCs, laptop computers, glasses with a built-in display or projector system, and other portable computing devices capable of receiving and displaying or projecting content, televisions or other displays, and other devices that can used to view or otherwise access content.

Contemplated recommendation systems and methods can generate a set of recommended content to a user which may be based on a piece of content currently being played by a user (e.g., genre, ratings, content tags or other metadata, or other information associated with the piece of content) and/or based on one or more characteristics of the user (e.g., prior content played by the user or other usage statistics, a user profile, identifying information about the user, etc.).

It is further contemplated that such systems can be configured to generate a set of anticorrelated content which may be based on a piece of content currently being played by the user (e.g., genre, ratings, content tags or other metadata, or other information associated with the piece of content) and/or based on one or more characteristics of the user (e.g., prior content played by the user or other usage statistics, a user profile, identifying information about the user, etc.). The type of recommendation (i.e., correlated or anticorrelated) to be presented to the user preferably depends on an elapsed duration of the piece of content being played. In some embodiments, anticorrelated content may be displayed to the user during a first portion (first elapsed time period) while correlated content may be displayed to the user during a second portion (second elapsed time period) that is later than the first portion (i.e., some time after the first elapsed time period). In this manner, the systems and methods described herein allow for anticorrelated content to be recommended to a user in addition or alternatively to correlated content based upon an elapsed time or percentage of a playback of the piece of content.

Various objects, features, aspects, and advantages of the inventive subject matter will become more apparent from the following detailed description of preferred embodiments, along with the accompanying drawing figures in which like numerals represent like components.

BRIEF DESCRIPTION OF THE DRAWINGS

FIG. 4 illustrates an exemplary user interface showing anticorrelated content being displayed at a beginning portion of a current media playback while FIG. 5 illustrates an exemplary user interface showing correlated content being displayed at an end portion of a current media playback.

DETAILED DESCRIPTION

Figure 1:
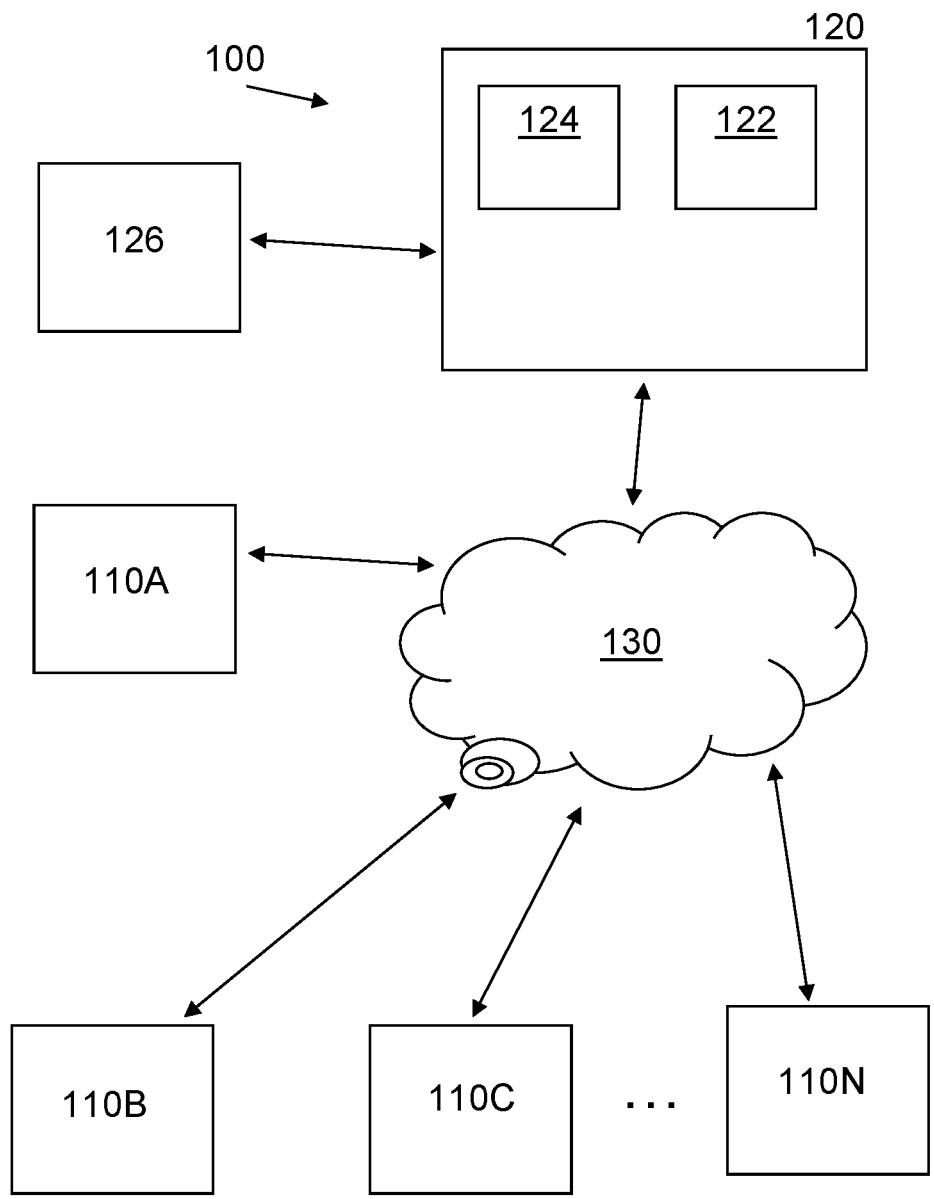
FIG. 1 is a diagram of one embodiment of a recommendation system.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The terms, "component", "module", "system", and the like used herein indicate a computer-related entity, hardware, firmware, software, a combination of software and hardware, or execution of software. For example, a component may be a procedure executed in a processor, a processor, an object, an execution thread, a program, and/or a computer, but is not limited thereto. For example, both an application executed in a computing device and a computing device may be components. One or more components may reside within a processor and/or an execution thread. One component may be localized within one computer. One component may be distributed between two or more computers. Further, the components may be executed by various computer readable media having various data structures stored therein. For example, components may communicate through local and/or remote processing according to a signal (for example, data transmitted to another system through a network, such as the Internet, through data and/or a signal from one component interacting with another component in a local system and a distributed system) having one or more data packets.

Illustrative logical blocks, configurations, modules, circuits, means, logic, and algorithm operations described herein may be implemented by electronic hardware, computer software, or in a combination of electronic hardware and computer software. In order to clearly exemplify interchangeability of hardware and software, the algorithms, steps and/or operations have been generally described in the functional aspects thereof. Whether the functionality is implemented as hardware or software depends on the specific application or design restraints given to the system.

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

Although the discussion herein may focus on an aircraft, it is contemplated that the systems and methods discussed herein could similarly be used on ships, trains, busses, and other vehicles, as well as content delivery systems and methods for use outside of vehicles.

The inventive subject matter describes systems and methods for providing content recommendations to one or more users, where the content recommendations vary depending upon an elapsed time of the current media playback.

In one embodiment shown in FIG. 1, system 100 is configured to provide content recommendations to one or more devices 110A-110N. In some embodiments, the devices 110A-110N are connected to a network 130, which may be an in-vehicle network but could also be a home or other network. Still in other embodiments, the devices may be connected to a local or remote content server or another server via a wired or wireless network. System 100 comprises a recommendation server 120 having a processor 122 and a memory 124 that is communicatively coupled with the processor 122. The processor 122 may be formed of one or more cores, and may include a processor, such as a central processing unit (CPU), a general purpose graphics processing unit (GPGPU), and other commercially suitable component. The processor 122 may read a computer program stored in the memory 124 and process data as described herein.

It is contemplated that the memory 124 may include at least one type of storage medium among a flash memory type, a hard disk type, a multimedia card micro type, a card type of memory (for example, an SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk. The recommendation server 120 may also be operated in relation to web storage performing a storage function of the memory 124 on the Internet.

Such devices may comprise a user device (portable computing device) such as those described above or a device that is part of an in-vehicle entertainment system and disposed within a vehicle, such as a seat back display unit, for example.

Preferably, each of the devices 110A-110N is communicatively coupled with the server 120 via network 130, which may be a wired and/or wireless network. Each of devices 110A-110N preferably comprises a display screen, projector, or other component(s) to allow a user to view or otherwise consume content and recommendations by using the device. The recommendation server 120 may be configured to receive demographic or other information from one or more of the devices 110A-110N.

The recommendation server 120 may also be communicatively coupled with a content server 126, which is configured to store a plurality of content. In other embodiments, at least some of the content may be stored on the user devices.

The processor 122 is preferably configured to generate and present one or more recommendations to at least one of the user devices 110A-110N based at least in part on the current content being played using the device and an elapsed time of the current content being played. Based on the elapsed time of the current content being played, the system 100 may recommend correlated content and/or anticorrelated content with respect to the current content being played. For example, in preferred embodiments, the system 100 is configured to recommend anticorrelated content if the elapsed time of the current content is less than a first threshold and recommend correlated content if the elapsed time of the current content is greater than a second threshold. The first and second thresholds may be the same but are preferably different.

In some embodiments, the first threshold may be a specific percentage (e.g., 5%, 10%, 20%, etc.) of the total playback time of the content. Thus, for a piece of content totaling one hour (60 minutes) of playback time, the first threshold may be the first 3 minutes (i.e., 5%), the first 6 minutes (i.e., 10%), the first 12 minutes (i.e., 20%), and so forth.

In other embodiments, the first threshold could be a fixed number of minutes, such as the first five minutes, the first 10 minutes, the first 15 minutes, and so forth.

Similarly, it is contemplated that the second threshold may also be a specific percentage (e.g., 5%, 10%, 20%, etc.) of the total playback time of the content. Thus, for a piece of content totaling one hour (60 minutes) of playback time, the second threshold may be the last 3 minutes (i.e., 5%), the last 6 minutes (i.e., 10%), the last 12 minutes (i.e., 20%), and so forth. However, in other embodiments, the second threshold could be a fixed number of minutes, such as the last five minutes, the last 10 minutes, the last 15 minutes, and so forth.

It is further contemplated that there may be a period of time between the first and second thresholds where no content is recommended or where different content is recommended than the correlated and anticorrelated content or both correlated and anticorrelated content are recommended. In such period of time, it is contemplated information about the content may be displayed rather than recommended content.

In other embodiments, it is contemplated that the first threshold equals the second threshold. In such embodiments, it is contemplated that anticorrelated content may be recommended before the first threshold (i.e., the first half) while correlated content may be recommended after the first threshold (i.e., the second half).

Figure 6:
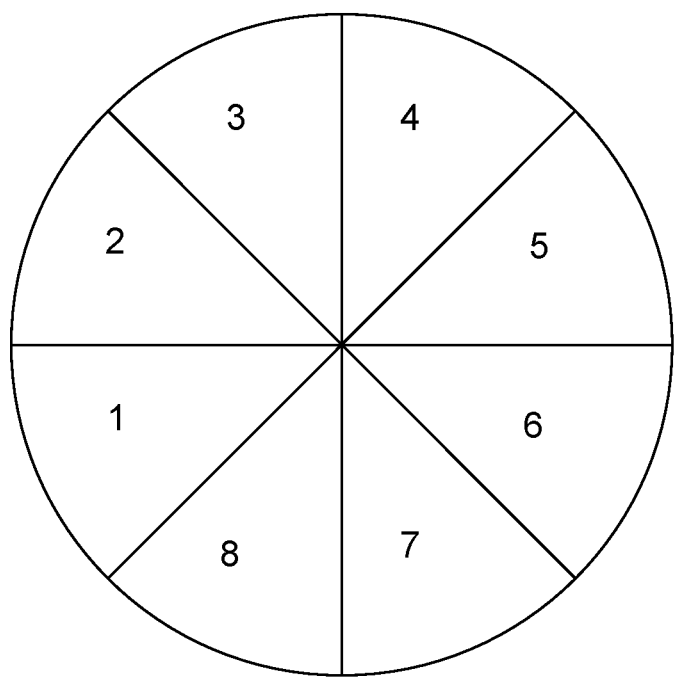
FIG. 6 illustrates one example for categorizing content.

Once the system 100 determines whether to recommend correlated or anticorrelated content, the system 100 can then select content to be recommended to the user based at least on the current content being played by the user or the last content played by the user where the user has paused the content, for example. In a simplistic example, content may be grouped into one of a set of categories. In the embodiment shown in FIG. 6, content can be grouped into one of eight different types or categories (e.g., content types 1 to 8). It is contemplated that opposing slices or pieces of the "wheel" can be opposite or anti-correlated content. Thus, Content 2 and Content 6 may be opposing, as are Content 3 and Content 7, Content 4 and Content 8, and Content 5 and Content 1. As a specific example, Content 2 may represent documentaries while Content 6 may represent science fiction. In such example, a value for the type of the current content could be determined, and then the total number of types divided by two (here, four) can be subtracted from the value to generate a subtotal. The system 100 could then check to determine if the subtotal is less than 0 and if so, multiple the result by −1 to get a suggested content value (Z). Of course, if the subtotal is greater than 0, the suggested content value (Z) equals the subtotal. This could be expressed by the formula below:

$$(X-N/2)=Y; \text{ if } Y<0, \text{ then } Z=Y*-1; \text{ else } Z=Y$$

The suggested content value (Z) could then be used to determine the type of content to recommend, and specific content within that type or genre could be recommended based on one or more factors such as a popularity of the content, a total playback time of the content, a determination whether the user has previously watched the content, a rating of the content, media details, content tags or other metadata, historical statistical data, and so forth.

Once content is selected, the recommended content can then be presented or displayed on or using the user device.

Alternatively, in other embodiments, the system 100 may select the recommended content (correlated or anticorrelated content) based on content tags or other metadata associated with the current content being played. In such embodiments, it is contemplated that pieces of content may be associated with one or more content tags or other information or metadata that can be used to select the recommended content. The content tags or other metadata may, for example, list correlated content and/or anticorrelated content to be selected by the system 100. This is useful where the available content is known and finite, and especially useful where the number of content titles available is a manageable number (e.g., less than 250 pieces of content). Thus, in such embodiments, the system 100 may review the metadata associated with the current content and then select the recommended content based on the metadata. Where a list of correlated content or anticorrelated content is provided, the system 100 may display titles and other information of the content associated with the appropriate list. In one example, such information may be displayed in a window overlaid over the current content, so the user may see titles, pictures, and/or other information associated with the recommend content.

It is contemplated that the content tags or other metadata may be preassociated with the content, such as by the content provider or other party. Thus, when the content is loaded on to or otherwise made available to a content server, some or all of the content can be associated with content tags or other metadata, such as described above.

It is further contemplated that the system 100 could itself associate content tags or other metadata with some or all of the content. Thus, for example, using various criteria, the system 100 could analyze each piece of content or information associated with the content, and assign or associate one or more tags or other metadata with the content. Such criteria could include, for example, genre, content ratings such as those offered by the Motion Picture Association of America (MPAA™) or other organization, critic or peer ratings, total elapsed time of the content, type of content (e.g., movie, television, music, etc.), and/or usage statistics collected by the system 100.

In still further embodiments, it is contemplated that the system 100 may select the recommended content (correlated or anticorrelated content) based on various criteria including those described above. For example, the system 100 could utilize one or more artificial intelligence (AI) algorithms to select the recommended content based on data collected by the recommendation server 120. Usage statistics over time may be used to offer better recommendations to users based on content that was or was not viewed, and an average length a piece of content was viewed, for example. If most users who selected a piece of content did not play the content to the end or to a certain point, the system 100 may decide not to recommend that piece of content to users in the future regardless of whether the recommended content is correlated or anticorrelated content.

Figure 2:
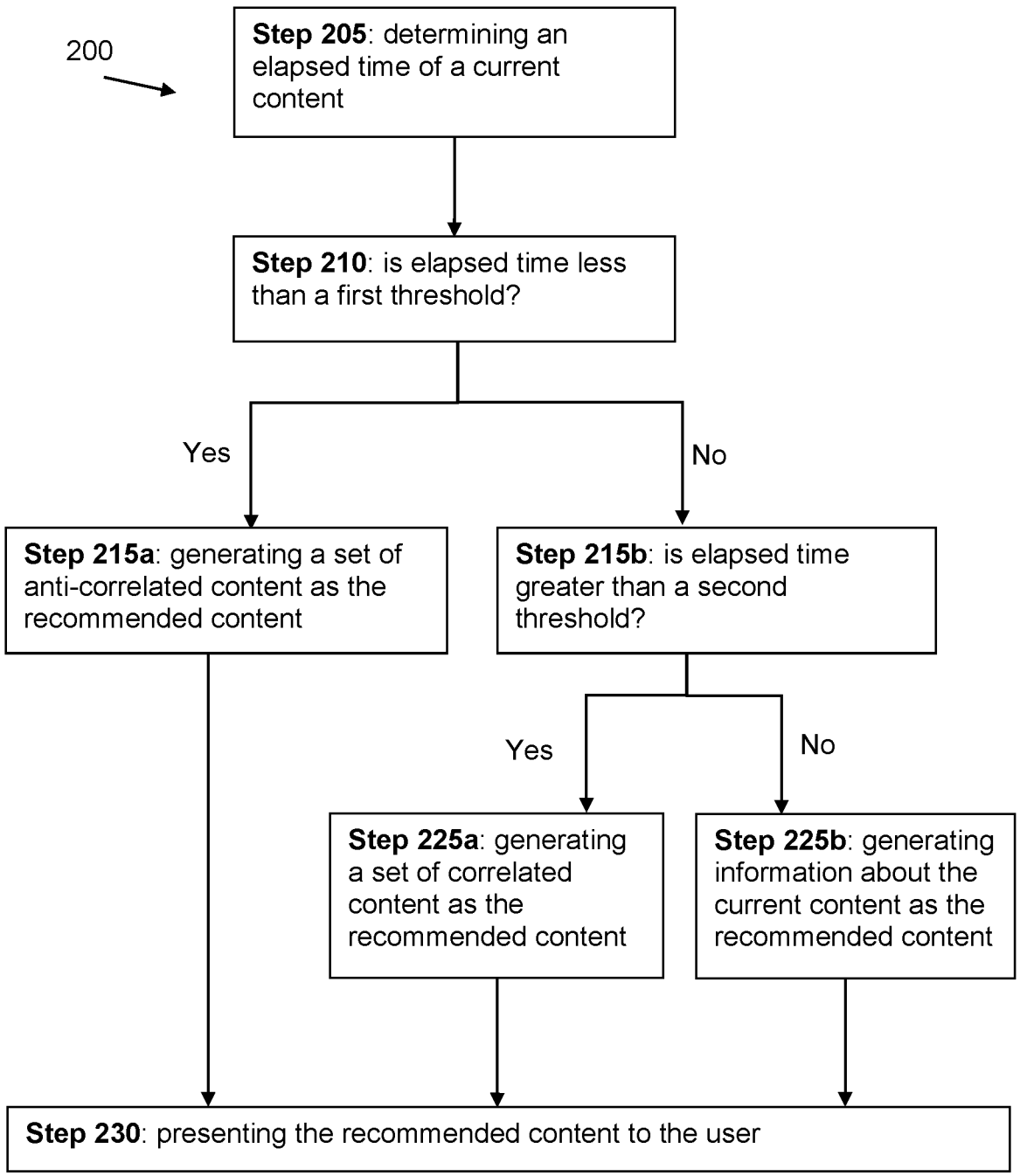
FIG. 2 is a flowchart of one embodiment of a method for providing a recommendation to a user.

FIG. 2 illustrates one embodiment of a method 200 for recommending content to one or more users. In step 205, an elapsed time of a current content being displayed can be determined such as by using the recommendation server described above. This can occur automatically when a user interrupts playback of the content or when the user clicks the display screen or otherwise interacts with the user device to bring up a menu, for example.

In step 210, the elapsed time can be compared with a first threshold such as by using a processor of the user device or a processor of a recommendation server, for example. If the elapsed time is less than the first threshold, a set of anticorrelated content can be generated as the recommended content in step 215*a*. If the elapsed time is greater than or equal to the first threshold, the elapsed time can be compared with a second threshold in step 215*b* such as by using the processor of the user device or the processor of the recommendation server, for example.

If the elapsed time is greater than the second threshold, a set of correlated content can be generated as the recommended content in step 225*a*. If the elapsed time is less than or equal to the second threshold, it is contemplated that information about the current content can be generated as the recommended content in step 225*b*. Alternatively, both correlated and anticorrelated content could be displayed in step 225*b*.

Of course, where the first and second threshold are the same, step 215*b* can be skipped if the elapsed time is greater than or equal to the first threshold, and the set of correlated content can be generated as the recommended content in step 225*a*

In step 230, the recommend content (e.g., the anticorrelated content, the correlated content or information about the current content) can be presented to the user on or using the user device.

Of course, it is alternatively contemplated that each piece of content can be associated with a set of correlated content and/or a set of anticorrelated content. In other words, a server does not need to generate the set of content to be recommended on the fly but can pre-generate the sets of content and present that information as the content is transferred or streamed, for example. It is also contemplated that each piece of content can be preassociated with a set of correlated content and/or a set of anticorrelated content, such as by the content provider. In such example, the content can be loaded on a content server or other storage location and already be associated with the set of correlated content and/or the set of anticorrelated content. Where the content is associated with correlated content and anticorrelated content, it is contemplated that method 200 only requires that the elapsed time of the current content be determined, and the elapsed time compared to one or more thresholds as discussed above. Then, based on the result of the comparison, the correlated content or anticorrelated content can be presented as suggested content to the user.

Figure 3:
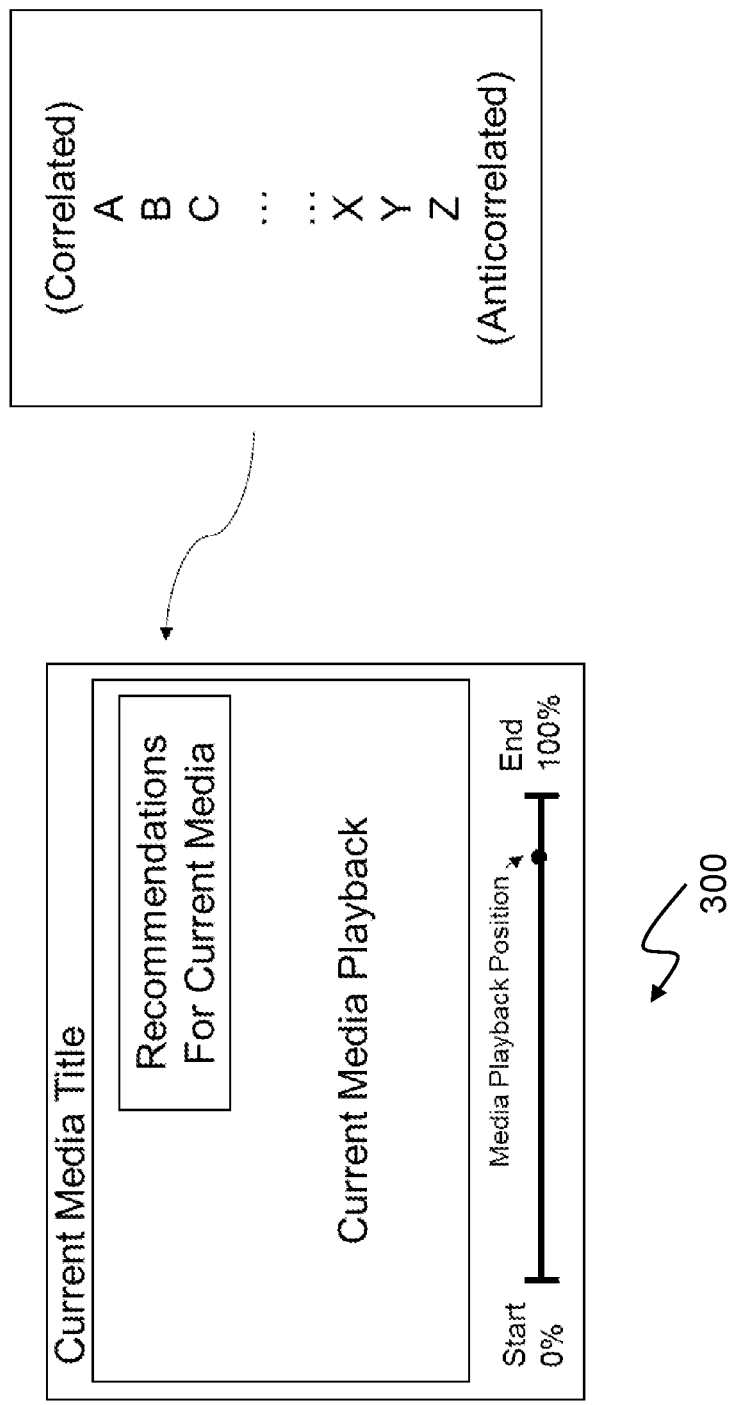
FIG. 3 illustrates an exemplary user interface showing correlated content being displayed at an end portion of a current media playback.

As shown in FIG. 3, a user is playing or has previously played a piece of content using a user interface 300. The elapsed time of the content being played or recently played (such as when it is paused) is shown in the lower middle portion of the interface 300 where the elapsed time is closer to the end than the beginning of the content. As discussed above with reference to FIGS. 1-2, a set of content correlated to the current content can be recommended if the elapsed time exceeds a second threshold (e.g., toward the end of playback of the current content) and a set of content that is not correlated (anticorrelated) to the current content can be recommended if the elapsed time is less than a first threshold (e.g., at the beginning of playback of the current content). As discussed above, the first and second thresholds could each be defined as a specific percentage of the total playback time of the current content or a specific elapsed time, for example. In this manner, a user is recommended similar (correlated) content (e.g., Content A, B, C) as the user nears completion of the current media playback (elapsed time exceeds the second threshold) which would appear to indicate that the user has enjoyed the current content. In contrast, the user is recommended non-similar or anticorrelated content (e.g., Content X, Y, Z) in the beginning of playback of the current content (elapsed time less than the first threshold) as the desire to change content early on may indicate that the user prefers different content to the current content.

As discussed herein, it is contemplated that the type of content to be displayed (i.e., correlated or anticorrelated) can be determined in one or more different schemes:

In one embodiment, anticorrelated content may be presented if a playback position of a current content is less than or equal to 50% of a total playback time of the current content. Correlated content may be presented if the playback position of the current content is greater than 50% of the total playback time of the current content.

In another embodiment, anticorrelated content may be presented if a playback position of a current content is less than a first threshold (e.g., 20% of a total playback time of the current content), correlated content may be presented if the playback position of the current content is greater than a second threshold (e.g., 80% of a total playback time of the current content or 20% or less remaining of the current content), and no recommendation is presented if the playback position is equal to or greater than the first threshold and less than or equal to the second threshold.

In still another embodiment, a range or ratio of anticorrelated content to correlated content can be presented as the playback position of the current content changes over time from 0%-100%. Thus, in the beginning of playback, 100% of the suggested content could be anticorrelated content, while in the middle there may be both anticorrelated content and correlated content, and toward the end of playback, 100% of the suggested content could be correlated content.

Figures 4, 5:
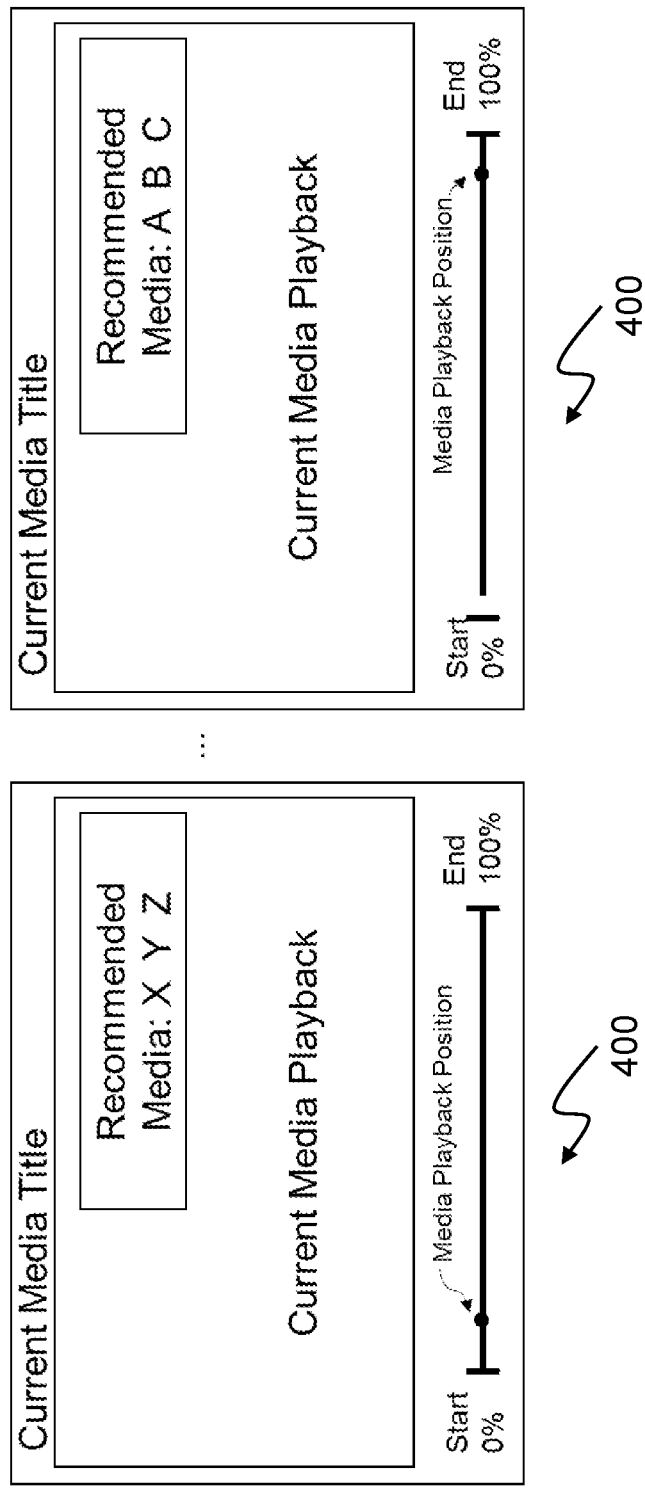

FIG. 4 illustrates one embodiment of a user interface 400 used to display a current content being played. The elapsed time of the current content being played or recently played (such as when the current content is paused) is shown in the lower middle portion of the interface 300 where the elapsed time is closer to the beginning than the end of the current content. Because the elapsed time is less than a first threshold in this example, the recommended content being displayed in the overlay is anticorrelated content (X, Y, Z). As discussed above, it is contemplated that titles, pictures, or other information for each piece of the anticorrelated content may be displayed in an overlay or otherwise to the user.

FIG. 5 illustrates the user interface 400 used to display a current content being played. The elapsed time of the current content being played or recently played (such as when the current content is paused) is shown in the lower middle portion of the interface 300. Here, the elapsed time is closer to the end rather than the beginning of the current content. Because the elapsed time is greater than a second threshold in this example, the recommended content being displayed in the overlay is correlated content (A, B, C). As discussed above, it is contemplated that titles, pictures, or other information for each piece of the correlated content may be displayed in the overlay or otherwise to the user.

The embodiments described above have been described as being generally implementable by a server, but those skilled in the art will appreciate well that the present disclosure is combined with computer executable commands and/or other program modules executable in one or more computers and/or be implemented by a combination of hardware and software. Software may include one or more routines, programs, components, data structures, and the like performing a specific task or implementing a specific abstract data form. Those skilled in the art will appreciate that the methods described herein could be carried out by a personal computer, a hand-held computing device, a server, and other computer system configurations.

The exemplary embodiments described above may be carried out in a distribution computing environment, in which certain tasks are performed by remote processing devices connected through a communication network. In the distribution computing environment, a program module may be located in both a local memory storage device and a remote memory storage device.

The servers and computing devices described herein generally include various computer readable media. The computer readable media may be any type of computer readable medium, and the computer readable medium includes volatile and non-volatile media, transitory and non-transitory media, and portable and non-portable media. As a non-limited example, the computer readable medium may include a computer readable storage medium and a computer readable transmission medium. The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a Random Access Memory (RAM), a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A system for providing content recommendations to one or more users, comprising:
   a recommendation server having a processor and a memory communicatively coupled with the processor;
   the recommendation server configured to receive from a user device a request for recommended content associated with a current content, wherein the request comprises at least an elapsed playback time of the current content;
   wherein the recommendation server is configured to compare the playback time with a first threshold using the processor, and, if the elapsed playback time is less than the first threshold, (i) generate a first content recommendation and (ii) transmit the first content recommendation to the user device; and wherein the first content recommendation comprises anticorrelated content with respect to the current content.

2. The system of claim 1, wherein the recommendation server is further configured to:
generate a second content recommendation if the elapsed playback time is greater than the first threshold;
transmit the second content recommendation to the user device; and
wherein the second content recommendation comprises correlated content with respect to the current content.

3. The system of claim 1, wherein the recommendation server is further configured to:
compare the elapsed playback time with a second threshold;
generate a second content recommendation if the elapsed playback time is greater than the second threshold;
transmit the second content recommendation to the user device; and
wherein the second content recommendation comprises correlated content with respect to the current content.

4. The system of claim 3, wherein the second threshold is greater than the first threshold.

5. The system of claim 1, wherein the recommendation server causes the first content recommendation to be presented on the user device.

6. The system of claim 3, wherein the recommendation server is further configured to generate a third content recommendation if the playback time is greater than the first threshold and less than or equal to the second threshold, and transmit the third content recommendation to the user device.

7. The system of claim 6, wherein the second threshold is greater than the first threshold.

8. The system of claim 6, wherein the recommendation server causes the third content recommendation to be presented on the user device.

9. The system of claim 1, wherein the user device comprises a smart phone, a tablet PC, a laptop computer, a desktop computer, glasses with a built-in display or projector system, a television, a display unit of an in-flight entertainment system, and a projector.

10. The system of claim 1, wherein the first content recommendation is based on at least one of a genre of the current content, a content rating of the current content, a critic rating of the current content, metadata of the current content, an actor in the current content, a runtime of the current content, and tags or keywords associated with the current content.

11. A method for providing content recommendations, comprising:
providing a recommendation server having a processor and a memory, the processor communicatively coupled with the memory;
receiving a request for recommended content from a user device that includes an elapsed playback time of a current content being played on the user device;
comparing the elapsed playback time with a first threshold;
if the playback time is less than the first threshold, generating a first content recommendation and transmitting the first content recommendation to the user device;
if the playback time is greater than or equal to the first threshold, comparing the elapsed playback time with a second threshold;
if the playback time is greater than the second threshold, generating a second content recommendation and transmitting the second content recommendation to the user device; and
wherein the first content recommendation comprises anticorrelated content with respect to the current content and the second content recommendation comprises correlated content with respect to the current content.

12. The method of claim 11, wherein the second threshold is greater than the first threshold.

13. The method of claim 11, further comprising presenting the first or second content recommendation on the user device.

14. The method of claim 11, further comprising:
generating a third content recommendation if the playback time is greater than the first threshold and less than or equal to the second threshold; and
transmitting the third content recommendation to the user device, wherein the second threshold is greater than the first threshold.

15. The method of claim 14, wherein the third content recommendation comprises correlated and anticorrelated content with respect to the current content.

16. The method of claim 14, wherein the processor causes the third content recommendation to be presented on the user device.

17. The method of claim 11, wherein the user device comprises a smart phone, a tablet PC, a laptop computer, a desktop computer, glasses with a built-in display or projector system, a television, a display unit of an in-flight entertainment system, and a projector.

18. The method of claim 11, wherein the first content recommendation or second content recommendation is based on at least one of a genre of the current content, a content rating of the current content, a critic rating of the current content, metadata of the current content, an actor in the current content, a runtime of the current content, and tags or keywords associated with the current content.

19. A method for providing content recommendations, comprising:
providing a recommendation server having a processor and a memory, the processor communicatively coupled with the memory, wherein the recommendation server is communicatively coupled with a content server configured to store a set of content;
wherein the recommendation server generates a first content recommendation and a second content recommendation for each piece of content of the set of content, wherein the first content recommendation for each piece of content comprises anticorrelated content with respect to that piece of content and the second content recommendation for each piece of content comprises correlated content with respect to that piece of content;
when a user interacts with a piece of content being played, comparing an elapsed playback time of the current content with a first threshold;
presenting the first content recommendation on the user device if the elapsed playback time is less than the first threshold;
if the elapsed playback time is greater than or equal to the first threshold, comparing the elapsed playback time of the current content with a second threshold; and
presenting the second content recommendation on the user device if the elapsed playback time is greater than the second threshold, wherein the second threshold is greater than the first threshold.

20. The method of claim 19, wherein the user device compares the elapsed playback time of the current content with the first threshold and presents the first content recommendation if the elapsed playback time is less than the first threshold.

* * * * *